United States Patent

Schneider

(10) Patent No.: US 9,333,954 B2
(45) Date of Patent: May 10, 2016

(54) DRIVER ASSISTANCE SYSTEM FOR A MOTOR VEHICLE

(71) Applicant: GM GLOBAL TECHNOLOGY OPERATIONS LLC, Detroit, MI (US)

(72) Inventor: Tobias Schneider, Huenfelden-Mensfelden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 8 days.

(21) Appl. No.: 14/326,245

(22) Filed: Jul. 8, 2014

(65) Prior Publication Data

US 2015/0019080 A1    Jan. 15, 2015

(30) Foreign Application Priority Data

Jul. 9, 2013 (DE) ............. 20 2013 006 196 U

(51) Int. Cl.
| | |
|---|---|
| *B60T 7/22* | (2006.01) |
| *B60W 30/12* | (2006.01) |
| *B60T 7/12* | (2006.01) |
| *B60W 30/08* | (2012.01) |
| *B62D 15/02* | (2006.01) |
| *G08G 1/16* | (2006.01) |
| *B62D 6/00* | (2006.01) |
| *G01S 13/04* | (2006.01) |
| *G01S 15/04* | (2006.01) |
| *G01S 17/02* | (2006.01) |

(52) U.S. Cl.
CPC ... *B60T 7/22* (2013.01); *B60T 7/12* (2013.01); *B60W 30/08* (2013.01); *B60W 30/12* (2013.01); *B62D 6/00* (2013.01); *B62D 15/0265* (2013.01); *G01S 13/04* (2013.01); *G01S 15/04* (2013.01); *G01S 17/023* (2013.01); *G08G 1/16* (2013.01); *G08G 1/162* (2013.01); *G08G 1/165* (2013.01); *G08G 1/166* (2013.01); *G08G 1/167* (2013.01); *B60T 2201/022* (2013.01)

(58) Field of Classification Search
CPC ...... B60W 30/12; B60W 30/08; G08G 1/162; G08G 1/16; G08G 1/165; G08G 1/166; G08G 1/167; G01S 13/04; G01S 15/04; G01S 17/023; B60T 7/12; B60T 7/22; B60T 2201/022; B62D 15/0265; B62D 6/00
USPC ............... 701/41, 70, 301; 342/27; 356/4.01; 367/93; 280/735
See application file for complete search history.

(56) References Cited

U.S. PATENT DOCUMENTS

| | | | | |
|---|---|---|---|---|
| 7,617,048 | B2 * | 11/2009 | Simon | .................... G01S 13/931 280/735 |
| 8,005,616 | B2 * | 8/2011 | Beuschel | ................. B60T 7/22 303/191 |

(Continued)

FOREIGN PATENT DOCUMENTS

| | | |
|---|---|---|
| DE | 10341753 A1 | 4/2005 |
| DE | 102007049516 A1 | 4/2008 |

(Continued)

*Primary Examiner* — Russell Frejd
(74) *Attorney, Agent, or Firm* — Ingrassia Fisher & Lorenz PC

(57) ABSTRACT

A driver assistance system and method are disclosed which provide improved determination of possible collision objects. The system includes at least one sensor and a classification device. The threshold value of the classification device for classifying an object sensed by the at least one sensor as a possible collision object is lowered when a possible hazard situation in a region of surrounding located in front of the motor vehicle is determined based on data received from an inter-vehicular communication device. As a result, hazard situations which may not yet be determined by means of sensors belonging to conventional vehicles because of the distance or the position of the possible hazard situation with respect to the motor vehicle can be detected earlier.

13 Claims, 3 Drawing Sheets

(56) References Cited

U.S. PATENT DOCUMENTS

2007/0241870 A1    10/2007  Ohmura et al.
2014/0168415 A1*   6/2014   Ihlenburg ............... B60R 11/04
                                                        348/118

FOREIGN PATENT DOCUMENTS

| DE | 102008024707 A1 | 11/2009 |
| DE | 102010006214 A1 | 8/2011 |
| DE | 102011077997 A1 | 1/2012 |

* cited by examiner

DRIVER ASSISTANCE SYSTEM FOR A MOTOR VEHICLE

CROSS REFERENCE TO RELATED APPLICATION

This application claims priority to German Patent Application No. 202013006196.0 filed Jul. 9, 2013, which is incorporated herein by reference in its entirety.

TECHNICAL FIELD

The application relates to a driver assistance system for a motor vehicle, a motor vehicle, a computer program product and a computer-readable medium.

BACKGROUND

DE 10 2010 006 214 A1 discloses an emergency braking assistance for the automatic braking of a vehicle for avoiding a collision or reducing collision consequences when a detected collision object is known, wherein at a determined intervention time a braking system of the vehicle is automatically activated in such a manner that a collision with a detected collision object can be avoided or at least the collision consequences reduced. The intervention time is determined as a function of the end time of a determined driver reaction time and of the determined last possible braking time.

SUMMARY

The present disclosure provides a driver assistance system for a motor vehicle, a motor vehicle, a computer program product and a computer-readable medium, which makes possible a further improved determination of possible collision objects.

According to an aspect of the present disclosure, a driver assistance system for a motor vehicle includes at least one sensor designed for sensing objects in the region of surroundings of the motor vehicle. The driver assistance system also includes a classification device, designed for classifying objects sensed by the at least one sensor as possible collision objects. Furthermore, the driver assistance system includes a computer unit and a computer program product which, when it is executed on the computer unit, instructs the computer unit to carry out the following steps: (i) determining if there is a possible hazard situation in a region of surroundings located in front of the motor vehicle, based on data received from a vehicle-to-vehicle communication device and/or a vehicle-to-vehicle infrastructure communication device of the motor vehicle; and (ii) in the case that it is determined that there is a possible hazard situation in the region of the surroundings located in front of the motor vehicle, lowering of a threshold value of the classification device for classifying an object sensed by means of the at least one sensor as a possible collision object.

The driver assistance system according to the present disclosure makes possible further improved determination of possible collision objects. This is affected, in particular, by determining if there is a possible hazard situation in a region of surroundings located in front of the motor vehicle based on data received from a vehicle-to-vehicle communication device and/or a vehicle-to-infrastructure communication device of the motor vehicle. The threshold value of the classification device for classifying an object sensed by means of the at least one sensor as possible collision object is lowered when the mentioned data a possible hazard situation in the region of the surroundings located in front of the motor vehicle is determined. This is based on the consideration that hazard situations can also be determined based on this data in an advantageous manner which cannot yet be determined by means of sensors belonging to conventional vehicles because of the distance or the position of the possible hazard situation with respect to the motor vehicle. Because of this, such possible hazard situations can be detected early on. Furthermore, lowering the threshold value advantageously makes possible reliably classifying smaller possible collision objects as collision objects in such situations for example a motorcycle or objects which are smaller than a motorcycle.

In one aspect, the present disclosure provides at least one sensor designed as a runtime-based sensor for sending and receiving signals. In the mentioned embodiment, the threshold value of the classification device is a value of signal strength of a signal sent back from an object. Such runtime-based sensors are particularly suitable for sensing possible collision objects in the region of surroundings of the motor vehicle. The sensor in this case can be selected in particular from the group consisting of a radar sensor, a lidar sensor and an ultrasound sensor. The mentioned sensors, which are also called surround sensors, are increasingly provided in motor vehicles, as a result of which the number of components needed for the driver assistance system can be advantageously reduced.

In a further aspect of the present disclosure, the at least one sensor is designed as an optical camera, and in particular as a front camera of the motor vehicle. The threshold value of the classification device is a size of an object contained in an image recorded by means of the optical camera. By means of an optical camera, possible collision objects in the region of the surroundings of the motor vehicle can also be reliably determined In another aspect of the present disclosure, the driver assistance system additionally includes an actuating device designed for automatically actuating at least one element of the motor vehicle, selected from the group consisting of a braking device, a driving device, a steering device and a warning device. Thus, in a possible hazard situation, autonomous intervention in the driving dynamics of the motor vehicle can be advantageously affected by means of the driver assistance system or the occupants of the motor vehicle, in particular the driver of the motor vehicle informed of such a hazard situation.

In a further aspect of the present disclosure, the computer unit is additionally instructed to carry out the following steps: lowering a triggering threshold of the actuating device for automatic actuating the at least one element of the motor vehicle in the case that it is determined that there is a possible hazard situation in the region of the surroundings located in front of the motor vehicle. By lowering the triggering threshold for automatically actuating the at least one element, for example a time to collision value or TTC-value, the latency period or reaction time of the driver assistance system can be advantageously further reduced and the automatic actuation compared with a previous triggering threshold takes place at an earlier time. In a possible hazard situation, earlier outputting of a warning message or an earlier autonomous intervention in the driving dynamics of the motor vehicle can thus take place.

The driver assistance system can be selected from the group consisting of an emergency braking system, a lane-keeping assistant and a collision warning system. Such driver assistance systems are particularly suited for avoiding a collision with the determined possible collision object by means of autonomous intervention in the driving dynamics and/or by means of outputting a corresponding warning message.

Another embodiment of the present disclosure relates to a motor vehicle, which includes a driver assistance system according to any one of the mentioned aspects. The motor vehicle can in particular be a passenger car or a utility vehicle.

A further embodiment of the present disclosure relates to a computer program product executable on a computer unit of a driver assistance system of a motor vehicle. The driver assistance system includes at least one sensor and one classification device. The sensor is designed for sensing objects in the region of surroundings of the motor vehicle. The classification device is designed for classifying objects sensed by means of the at least one sensor as possible collision objects, The computer program product instructs the computer unit to carry out the following steps: (i) determining if there is a possible hazard situation in a region of surroundings located in front of the motor vehicle, based on data received from a vehicle-to-vehicle communication device and/or a vehicle-to-infrastructure communication device of the motor vehicle; and (ii) in the case that it is determined that there is a possible hazard situation in the region of the surroundings located in front of the motor vehicle, lowering a threshold value of the classification device for classifying an object sensed by means of the at least one sensor as possible collision object. In addition to this, a further embodiment of the present disclosure relates to a computer-readable medium, on which a computer program product is stored.

The motor vehicle and the computer program product and the computer-readable medium according to the mentioned embodiments have the advantages already mentioned in connection with the relevant driver assistance system described above.

A further aspect of the present disclosure relates to a method for operating a driver assistance system of a motor vehicle, wherein the driver assistance system includes at least one sensor and on classification device. The at least one sensor device is designed for sensing objects in the region of surroundings of the motor vehicle. The classification device is designed for classifying objects sensed by means of the at least one sensor as possible collision objects. The method includes the following steps: (i) determining if there is a possible hazard situation in a region of surroundings located in front of the motor vehicle based on data received from a vehicle-to-vehicle communication device and/or a vehicle-to-infrastructure communication device of the motor vehicle; (ii) in the case that it is determined that there is a possible hazard situation in the region of the surroundings located in front of the motor vehicle, lowering of a threshold value of the classification device for classifying an object sensed by means of the at least one sensor as possible collision object. The method according to the mentioned embodiment has the advantages already mentioned in connection with the relevant driver assistance system.

A further aspect of the present disclosure relates to a device for operating a driver assistance system of a motor vehicle. The driver assistance system includes at least one sensor and one classification device. The at least one sensor is designed for sensing objects in the region of surroundings of the motor vehicle. The classification device is designed for classifying objects sensed by means of the at least one sensor as possible collision objects. The device for operating the driver assistance system includes: (i) means for determining if there is a possible hazard situation in a region of surroundings located in front of the motor vehicle, based on data received from a vehicle-to-vehicle communication device and/or a vehicle-to-infrastructure communication device of the motor vehicle;

and (ii) means for lowering a threshold value of the classification device for classifying and object sensed by means of the at least one sensor as possible collision object in the case that it is determined that there is a possible hazard situation in the region of the surroundings located in front of the motor vehicle. By means of the mentioned device for operating a driver assistance system of a motor vehicle further improved determining of possible collision objects is made possible as already mentioned.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
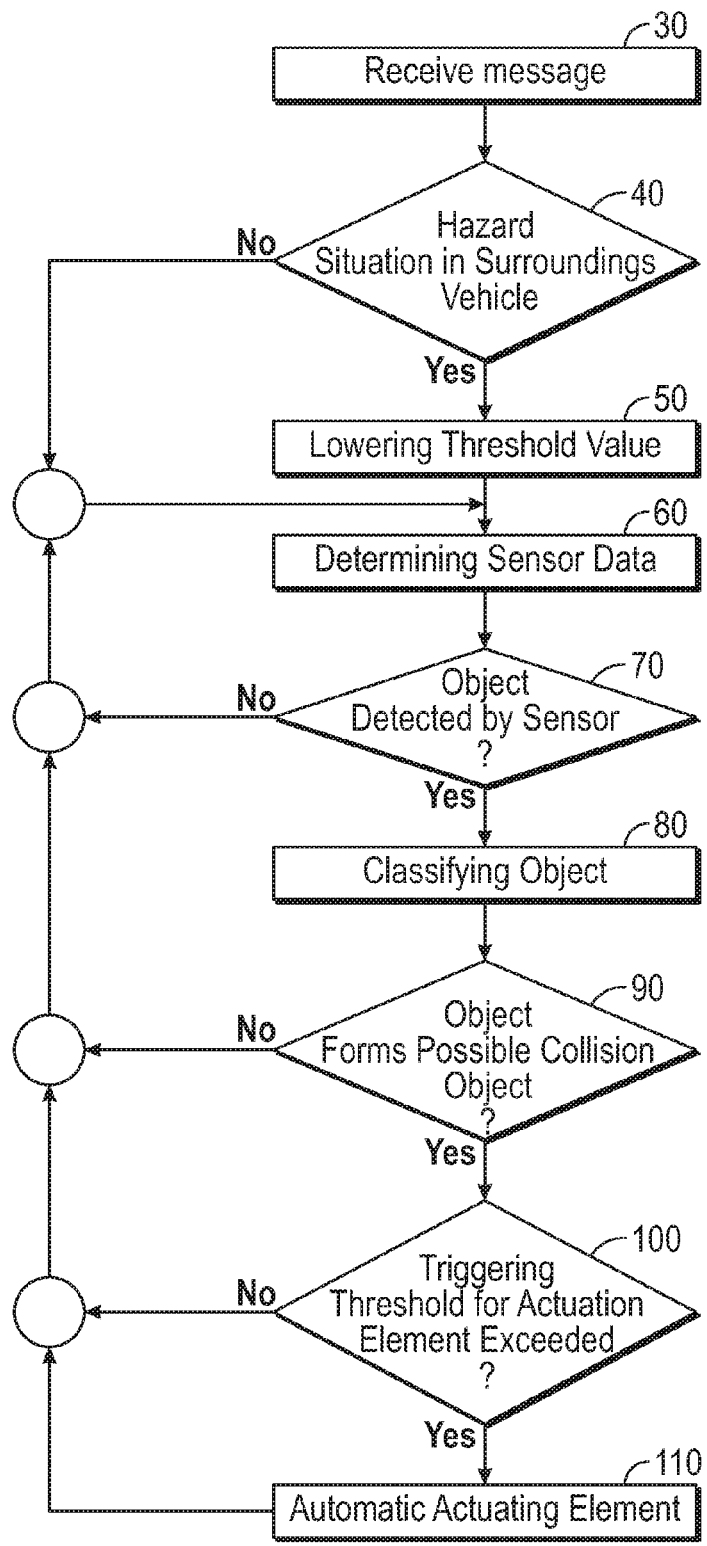
FIG. 1 shows a flow diagram of a method which is carried out by means of a computer unit.

FIG. 1 shows a flow diagram of a method which is carried out by means of a computer unit of a driver assistance system according to one or more aspect of the present disclosure mentioned above when a computer program product is executed on the computer unit.

Here, the driver assistance system includes at least one sensor and one classification device. The sensor is designed for sensing object in the region of surroundings of the motor vehicle and the classification device of classifying objects sensed by means of the at least one sensor as possible collision objects. The sensor in this case can be designed as a runtime-based sensor for sending and receiving signals, such as a radar sensor, a lidar sensor and/or an ultrasound sensor. Alternately, the sensor can be designed as an optical camera.

The driver assistance system additionally includes an actuating device, which is designed for automatically actuating at least one element of the motor vehicle, selected from the group consisting of a braking device, a driving device, a steering device and a warning device. For example, the driver assistance system may be designed as an emergency braking system, which is also called collision imminent braking or CIB, as lane-keeping assistant and/or as collision warning system.

During an operation of the motor vehicle, a message is received in a step 30 by means of a vehicle-to-vehicle communication device and/or by means of a vehicle-to-infrastructure communication device of the motor vehicle. The mentioned communication devices in this case are also called car-to-car (C2C) or vehicle-to-vehicle (V2V) communication or car-to-infrastructure (C2I) or vehicle-to-roadside (V2R) communication and summarized, as car-to-x (C2X) or vehicle-to-x (V2X) communication. These communication devices may be generically referred to as an inter-vehicular communication device.

Based on the message received in the step 30, it is determined in a step 40 if there is a possible hazard situation in a region of surroundings located in front of the motor vehicle. A possible hazard situation in a region of the surroundings located in front of the motor vehicle can be inferred for example in the case that another vehicle located in traveling direction in front of the motor vehicle carries out emergency braking and transmits information regarding a hazard situation connected with this to further road users by means of a vehicle-to-vehicle communication device.

In the case that it is determined in the step 40 that there is a possible hazard situation in the region of the surroundings located in front of the motor vehicle, automatic lowering of a threshold value of the classification device for classifying an object sensed by means of the at least one sensor as a possible collision object takes place in a step 50. In the case that the at least one sensor in this case is designed as a runtime-based sensor for sending and receiving signals, the threshold value of the classification device is a value of a signal strength, for example a value of an amplitude or an intensity of a signal returned from an object, which is, for example, determined in decibel or dB. Lowering the threshold value in this case is a lowering of the value of the signal strength above which an object sensed by means of the at least one sensor is classified as a possible collision object.

If the at least one sensor is designed as an optical camera, the threshold value of the classification device is a size of an object contained in an image recorded by means of the optical camera. The lowering of the threshold value in this case is a lowering of the size of an object contained in a recorded image, above which said object is classified as a possible collision object.

Determining data by means of the at least one sensor for sensing objects in the region of the surroundings of the motor vehicle takes place in a step 60. Based on the data determined in the step 60 it is determined in a step 70 if at least one object is sensed by the at least one sensor. If no object is sensed by the sensor, the steps 60 and 70 are carried out repeatedly. In the case, by contrast, that at least one object is sensed by the at least one sensor, classifying of the objects sensed by means of the at least one sensor as possible collision objects, i.e. objects which are determined to be above the threshold value of the classification device, and according to other objects, which do not constitute possible collision objects, i.e. objects which do not exceed the threshold value of the classification device.

In a step 90 it is determined if at least one of the objects sensed by the sensor and classified in the step 80 forms a possible collision object. In the case that it is determined in the step 90 that none of the objects sensed by the sensor forms a possible collision object, the steps 60 and 70 as well as 80 and 90 if appropriate are carried out repeatedly. In the case, by contrast, that it is determined in the step 90 that at least one of the objects sensed by the sensor forms a possible collision object, it is determined in a step 100 based on the data determined by the at least one sensor if a triggering threshold for automatic actuating of the at least one element is exceeded. For example, it is determined if a TTC-value, i.e. the time to a possible collision with the object undershoots a predetermined threshold value.

If it is determined in the step 100 that the triggering threshold for automatically actuating the at least one element of the motor vehicle is not exceeded, the steps 60 and 70 and if appropriate 80, 90 and 100 are carried out repeatedly. In the case, by contrast, that it is determined it the step 100 that the triggering threshold is exceeded, automatic actuation of the at least one element takes place in a step 110.

Raising the threshold value of the classification device lowered in the step 50 to the original value takes place in a configuration of the method following a predetermined period of time. A position of the motor vehicle can also be determined and the threshold value of the classification device raised to the original value in the case that the message received in the step 30 is provided with position data regarding the possible hazard situation, after the motor vehicle has passed the position of the possible hazard situation or in the case that the motor vehicle is subsequently located outside a predetermined region about the position of the hazard situation.

In the case that it is determined in the step 40 that there is no hazard situation in the region of the surroundings located in front of the motor vehicle, the threshold value of the classification device for classifying objects sensed by means of the at least one sensor as possible collision objects is maintained, i.e. the method after the step 40 is directly continued with the further steps 60 and 70 and if appropriate 80, 90, 100 and 110.

By means of the shown embodiment it is thus made possible for example, when a hazard situation which is not directly obvious is timely known through communication via a vehicle-to-vehicle communication, to specifically lower the sensitivity in particular of an emergency braking assistance system of the motor vehicle at this point in order to ensure safe triggering and to prepare the overall system for the situation. Thus the latency period of the system and thus also the reaction time can be reduced. It can thereby be avoided that the system erroneously fails to trigger. This is advantageous in particular with smaller hazard objects in the case of which the sensor-based detection as a possible obstacle is more complex. By lowering the detection threshold, i.e. the threshold value of the classification device, at this special point or in this situation, triggering can be made possible in a reliable manner.

Figure 2:
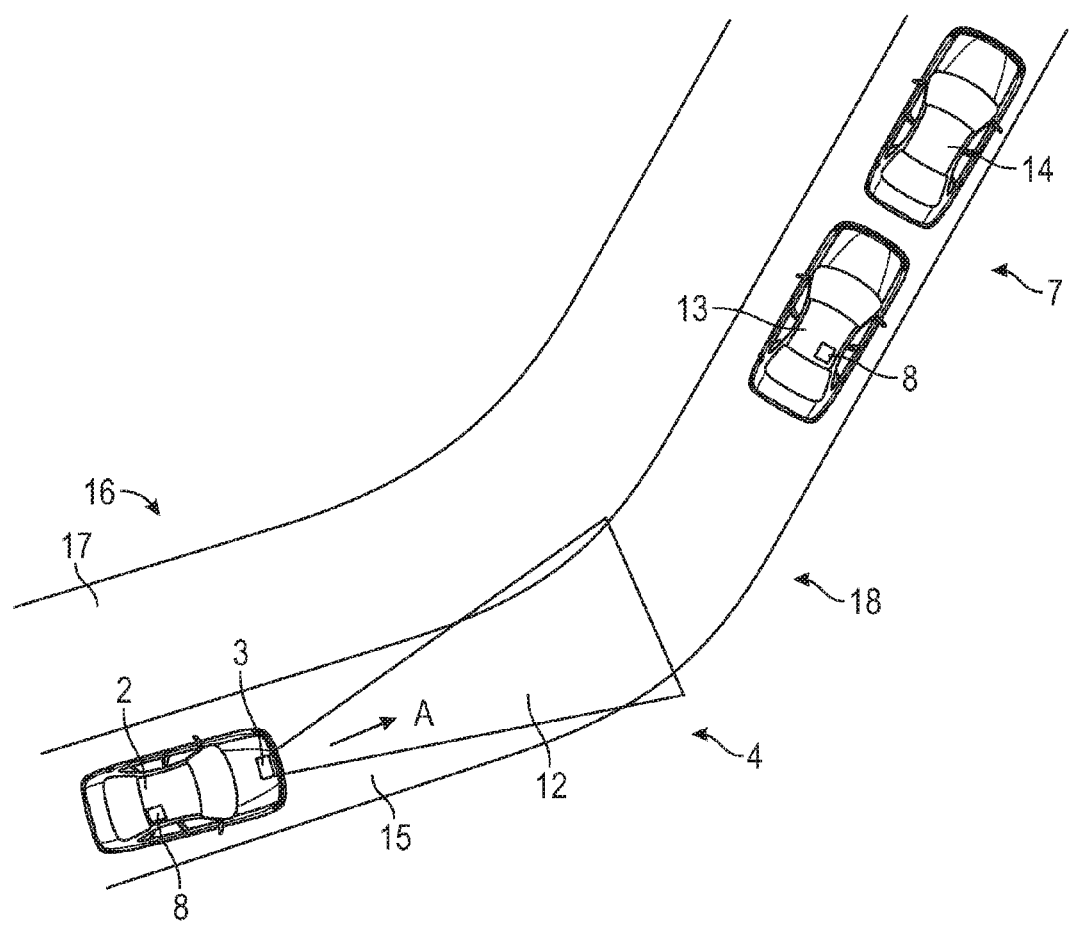
FIG. 2 shows an example of a traffic situation, in which a method, which is carried out by means of a computer unit, can be employed.

A hazard situation can for example be an invisible congestion end behind a curve, as is explained in more detail in connection with the following figure. In this regard, FIG. 2 shows an example of a traffic situation, in which a method, which is carried out by means of a computer unit, in particular the method explained in connection with FIG. 1, can be employed. In the shown traffic situation, a motor vehicle 2 in the form of a passenger car travels in a traveling direction schematically indicated by means of an arrow A on a first lane 15 of a road 16. In addition to the first lane 15, the road 16 has a further lane 17. The road 16 is for example part of a highway.

The motor vehicle 2 includes at least one sensor 3, which is designed for sensing objects in the region of surroundings 4 of the motor vehicle 2 within a schematically represented sensing range 12. The at least one sensor 3 in this case can be designed as a runtime-based sensor for sending and receiving signals, in particular as a radar sensor, a lidar sensor and/or an ultrasound sensor. Furthermore, the at least one sensor 3 can be designed as an optical camera. The motor vehicle 2 also includes a classification device, which is not shown in more detail in FIG. 2, designed for classifying objects sensed by means of the at least one sensor 3 as possible collision objects.

Located in traveling direction in front of the motor vehicle 2 on the first lane 15 are two further motor vehicles 13 and 14. The motor vehicles 13 and 14 form the congestion end of traffic congestion on the first lane 15. The congestion end in this case is located behind a curve 18 and is therefore difficult to see or imperceptible to the driver of the motor vehicle 2. In addition, the motor vehicles 13 and 14 in the shown situation are still outside the sensing range 12 of the at least one sensor 3 of the motor vehicle 2.

In the shown situation, the motor vehicle 13 has been braked to a halt by means of emergency braking, which was activated for example by the driver of the motor vehicle 13 or an emergency braking assistance system or both. The information regarding a hazard situation connected with this hazard and the exact position of said hazard situation is transmitted by means of a vehicle-to-vehicle communication device 8 of the motor vehicle 13 to the following vehicles and in particular to the motor vehicle 2, which likewise includes such a vehicle-to-vehicle communication device 8. Furthermore, the information regarding the hazard situation connected with this hazard and its exact position can be sent from the vehicle 13 to a roadside infrastructure device, also called roadside unit or RSU and from the latter transmitted to vehicles located in a region of the surroundings of the roadside infrastructure device.

As is explained in more detail in connection with the following figure, it can thereby be determined based on data received from the vehicle-to-vehicle communication device 8 of the motor vehicle 2 when there is a possible hazard situation in a region 7 of surroundings located in front of the motor vehicle 2. In the case when it is determined as in the shown situation that there is a possible hazard situation in the region 7 of the surroundings located in front of the motor vehicle 2, lowering of a threshold value of the classification device of the motor vehicle 2 for classifying objects sensed by means of the at least one sensor 3 of the motor vehicle 2 as possible collision objects can take place, i.e. the reaction threshold or the sensitivity of a corresponding driver assistance system of the motor vehicle 2 can be lowered.

Thus, triggering of the driver assistance system if required can reliably take place and the latency period or reaction time in the system reduced, by means of which in particular braking distance can be saved and an accident can be avoided depending on the situation. It can be avoided, furthermore, that the driver assistance system because of weak signal strength, for example because of only a small hazard-triggering object, such as for example a motorcycle or smaller object, fails to react. Further details are explained in more detail in connection with the following figure.

Figure 3:
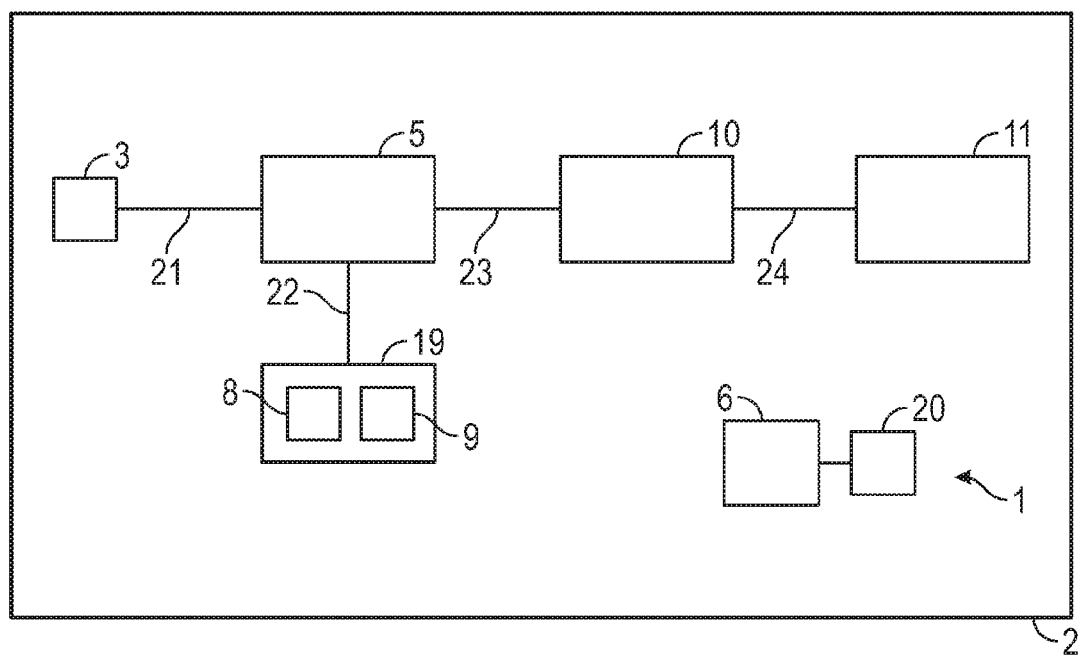
FIG. 3 shows a driver assistance system according to an embodiment of the present disclosure.

In this regard, FIG. 3 shows a driver assistance system 1 of the motor vehicle 2 shown in FIG. 2 according to an embodiment of the present disclosure. For the sake of clarity, the motor vehicle 2 is merely schematically shown in FIG. 3. The driver assistance system 1 is for example designed as an emergency braking system or as a collision warning system, and in addition to the at least one sensor 3 includes a classification device 5, which is designed for classifying objects sensed by means of the at least one sensor 3 as possible collision objects. The classification device 5 to this end is connected to the at least one sensor 3 via a signal line 21.

Furthermore, the driver assistance system 1 includes a computer unit 6 and a computer-readable medium 20, wherein on the computer-readable medium 20 a computer program product is stored which, when executed on the computer unit 6 instructs the computer unit 6 to carry out the methods according to the present disclosure explained above in particular the steps of the method shown in FIG. 1 by means of the elements mentioned there.

In particular, the classification device 5 in the shown embodiment is instructed for determining if there is a possible hazard situation in a region of surroundings located in front of the motor vehicle 2, based on data received from the vehicle-to-vehicle communication device 8 and/or a vehicle-to-infrastructure communication device 9 of the motor vehicle 2. The vehicle-to-vehicle communication device 8 and/or the vehicle-to-infrastructure communication device 9 in this case are part of a communication device 19 in the shown embodiment, which is connected to the classification device 5 via a signal line 22. In the case that it is determined that there is a possible hazard situation in the region of the surroundings located in front of the motor vehicle 2, the computer unit 6 is instructed furthermore for lowering a threshold value of the classification device 5 for classifying an object sensed by means of the at least one sensor 3 as possible collision object.

The driver assistance system 1 in the shown embodiment additionally includes an actuating device 10, which is designed for automatically actuating at least one element 11 of the motor vehicle 2, selected from the group consisting of a braking device, a driving device, a steering device and a warning device. The actuating device 10 to this end is connected to the at least one element 11 via a suitable control line 24.

The classification device 5 in the shown embodiment is additionally designed for determining a TTC-value of an object classified as a possible collision object, i.e. the period of time to a possible collision of the motor vehicle 2 with the object, based on data determined by the at least one sensor 3, in particular a distance and/or a speed of the possible collision object to the motor vehicle 2. Furthermore, the classification device 5 is designed for determining when a triggering threshold of the actuating device 10 for automatically actuating the at least one element 11 is exceeded, i.e. if the determined TTC-value undershoots a predetermined threshold value. In addition, the classification device 5 is designed for automatically actuating the at least one element 11 by means of the actuating device 10 if this is the case. To this end, the classification device 5 is connected to the actuating device 10 via a signal line 23.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A driver assistance system for a motor vehicle comprising:
 at least one sensor configured to sense objects in a region of surroundings of a motor vehicle;
 a classification device configured to classify an object sensed by the at least one sensor as a possible collision object;
 a processor configured to execute a computer program product which instructs the processor to carry out the following:
 determining a possible hazard situation in the region of surroundings located in front of the motor vehicle based on data received from an inter-vehicular sensing device of the motor vehicle; and
 lowering a threshold value of the classification device for classifying an object sensed by the at least one sensor as a possible collision object when the data received from the inter-vehicular sensing device of the motor vehicle indicates that there is a possible hazard situation in the region of the surroundings located in front of the motor vehicle.

2. The driver assistance system according to claim 1, wherein the at least one sensor comprises a runtime-based sensor for sending and receiving signals, and wherein the threshold value of the classification device is proportional to a signal strength of a signal sent back from the sensed object.

3. The driver assistance system according to claim 2, wherein the at least one sensor is selected from the group consisting of a radar sensor, a lidar sensor, and an ultrasound sensor.

4. The driver assistance system according claim 1, wherein the at least one sensor comprises an optical camera for capturing an image of the sensed object, and wherein the threshold value of the classification device is a size of the image.

5. The driver assistance system according to claim 1, further comprising an actuating device configured to automatically actuating at least one device of the motor vehicle selected from the group consisting of a braking device, a driving device, a. steering device, a warning device and combinations thereof.

6. The driver assistance system according to claim 5, wherein the processor is configured to lower a triggering threshold of the actuating device for automatically actuating the at least one device when it is determined that there is a possible hazard situation in the region of the surroundings located in front of the motor vehicle.

7. The driver assistance system claim 1, wherein the driver assistance system is selected from the group consisting of an emergency braking system, a lane-keeping assistant system and a collision warning system.

8. A motor vehicle comprising a driver assistance system according to claim 1.

9. A computer program product executed on a processor of a driver assistance system of the type having at least one sensor configured to sense an object in a region of surroundings of a motor vehicle and a classification device configured to classify the sensed object as a possible collision object, the computer program product configured to execute the following:
    determining a possible hazard situation in the region of surroundings located in front of the motor vehicle based on data received from an inter-vehicular sensing device of the motor vehicle; and
    lowering a threshold value of the classification device for classifying an object sensed by the at least one sensor as a possible collision object when the data received from the inter-vehicular sensing device of the motor vehicle indicates that there is a possible hazard situation in the region of the surroundings located in front of the motor vehicle.

10. The computer program product of claim 9 further configured to execute the following:
    automatically actuating at least one device of the motor vehicle selected from the group consisting of a braking device, a driving device, a steering device, a warning device and combinations thereof when the possible hazard situation in the region of the surroundings located in front of the motor vehicle exists.

11. A non-transitory computer-readable medium on which the computer program product according to claim 9 is stored.

12. A method for operating a driver assistance system of the type having at least one sensor configured to sense an object in a region of surroundings of a motor vehicle and a classification device configured to classify the sensed object as a possible collision object, the method comprising:
    determining a possible hazard situation in the region of surroundings located in front of the motor vehicle based on data received from an inter-vehicular sensing device of the motor vehicle; and
    lowering a threshold value of the classification device for classifying an object sensed by the at least one sensor as a possible collision object when the data received from the inter-vehicular sensing device of the motor vehicle indicates that there is a possible hazard situation in the region of the surroundings located in front of the motor vehicle.

13. The method of claim 12 further comprising automatically actuating at least one device of the motor vehicle selected from the group consisting of a braking device, a driving device, a steering device, a warning device and combinations thereof when the possible hazard situation in the region of the surroundings located in front of the motor vehicle exists.

* * * * *